(12) United States Patent
Talhouarn

(10) Patent No.: US 10,473,369 B2
(45) Date of Patent: Nov. 12, 2019

(54) STAGED EXPANSION SYSTEM AND METHOD

(71) Applicant: Carrier Corporation, Farmington, CT (US)

(72) Inventor: Fabien Talhouarn, Darnetal (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/573,934

(22) PCT Filed: May 15, 2015

(86) PCT No.: PCT/IB2015/001113
§ 371 (c)(1),
(2) Date: Nov. 14, 2017

(87) PCT Pub. No.: WO2016/185243
PCT Pub. Date: Nov. 24, 2016

(65) Prior Publication Data
US 2018/0292116 A1    Oct. 11, 2018

(51) Int. Cl.
*F25B 40/02*        (2006.01)
*F25B 41/04*        (2006.01)
(Continued)

(52) U.S. Cl.
CPC .............. *F25B 40/02* (2013.01); *F25B 40/00* (2013.01); *F25B 41/043* (2013.01); *B60P 3/20* (2013.01);
(Continued)

(58) Field of Classification Search
CPC .. B60P 3/20; F25B 40/02; F25B 40/00; F25B 41/043; F25B 2327/001; F25B 2600/0272; F26B 2341/0683
See application file for complete search history.

(56) References Cited

U.S. PATENT DOCUMENTS 3,423,951 A      1/1969   Eisberg
4,707,996 A *   11/1987   Vobach .................. F25B 25/02
                                                                 62/114
(Continued)

FOREIGN PATENT DOCUMENTS

EP          1329675 A2     7/2003
EP          1338449 A1     8/2003
(Continued)

OTHER PUBLICATIONS

Domanski, Piotr A., "Theoretical Evaluation of the Vapor Compression Cycle With a Liquid-Line/Suction-Line Heat Exchanger, Economizer, and Ejector", NISTIR 5606, Mar. 1995, U.S. Department of Commerce, 38 pages.
(Continued)

*Primary Examiner* — Melvin Jones
(74) *Attorney, Agent, or Firm* — Cantor Colburn LLP

(57) ABSTRACT

A refrigeration system includes a compressor configured to compress a refrigerant, a condenser, and an evaporator. A heat exchanger is disposed downstream of the condenser and upstream of the evaporator, and disposed downstream of the evaporator and upstream of the compressor, the heat exchanger configured to facilitate heat exchange between the refrigerant supplied from the condenser and the refrigerant supplied from the evaporator. A first expansion device is disposed downstream of the heat exchanger and upstream of the evaporator, and a second expansion device is disposed downstream of the condenser and upstream of the heat exchanger. The second expansion device is configured to cool the refrigerant passing therethrough to cool the refrigerant in the heat exchanger supplied from the evaporator to the compressor.

18 Claims, 1 Drawing Sheet

(51) Int. Cl.
*F25B 40/00* (2006.01)
*B60P 3/20* (2006.01)

(52) U.S. Cl.
CPC . *F25B 2327/001* (2013.01); *F25B 2341/0662* (2013.01); *F25B 2341/0683* (2013.01); *F25B 2600/0272* (2013.01)

(56) References Cited

U.S. PATENT DOCUMENTS

| | | | |
|---|---|---|---|
| 5,056,329 A | * | 10/1991 | Wilkinson ............... F25B 1/10 |
| | | | 62/197 |
| 5,140,827 A | | 8/1992 | Reedy |
| 5,784,892 A | | 7/1998 | Reedy |
| 5,970,721 A | | 10/1999 | Kamimura et al. |
| 6,539,735 B1 | | 4/2003 | Schmidt |
| 6,568,198 B1 | | 5/2003 | Tadano et al. |
| 6,948,327 B2 | | 9/2005 | Bischel et al. |
| 7,114,349 B2 | | 10/2006 | Lifson et al. |
| 7,251,947 B2 | | 8/2007 | Lifson et al. |
| 7,966,838 B2 | | 6/2011 | Lifson et al. |
| 8,240,161 B2 | | 8/2012 | Lifson et al. |
| 8,276,395 B2 | | 10/2012 | Lifson et al. |
| 8,424,326 B2 | | 4/2013 | Mitra et al. |
| 8,671,703 B2 | | 3/2014 | Mitra et al. |
| 8,904,813 B2 | | 12/2014 | Lifson et al. |
| 2010/0083677 A1 | | 4/2010 | Lifson et al. |
| 2013/0145780 A1 | | 6/2013 | Parsonnet et al. |
| 2015/0300544 A1 | * | 10/2015 | Okada ................... F16L 23/003 |
| | | | 285/403 |

FOREIGN PATENT DOCUMENTS

| | | |
|---|---|---|
| EP | 1489367 A1 | 12/2004 |
| JP | H11142007 A | 5/1999 |
| WO | 02092368 A1 | 11/2002 |
| WO | 2010061624 A1 | 6/2010 |
| WO | 2011112500 A2 | 9/2011 |
| WO | 2014171107 A1 | 10/2014 |

OTHER PUBLICATIONS

International Search Report and Written Opinion for application PCT/IB2015/001113, dated Jan. 20, 2016, 12 pages.

* cited by examiner

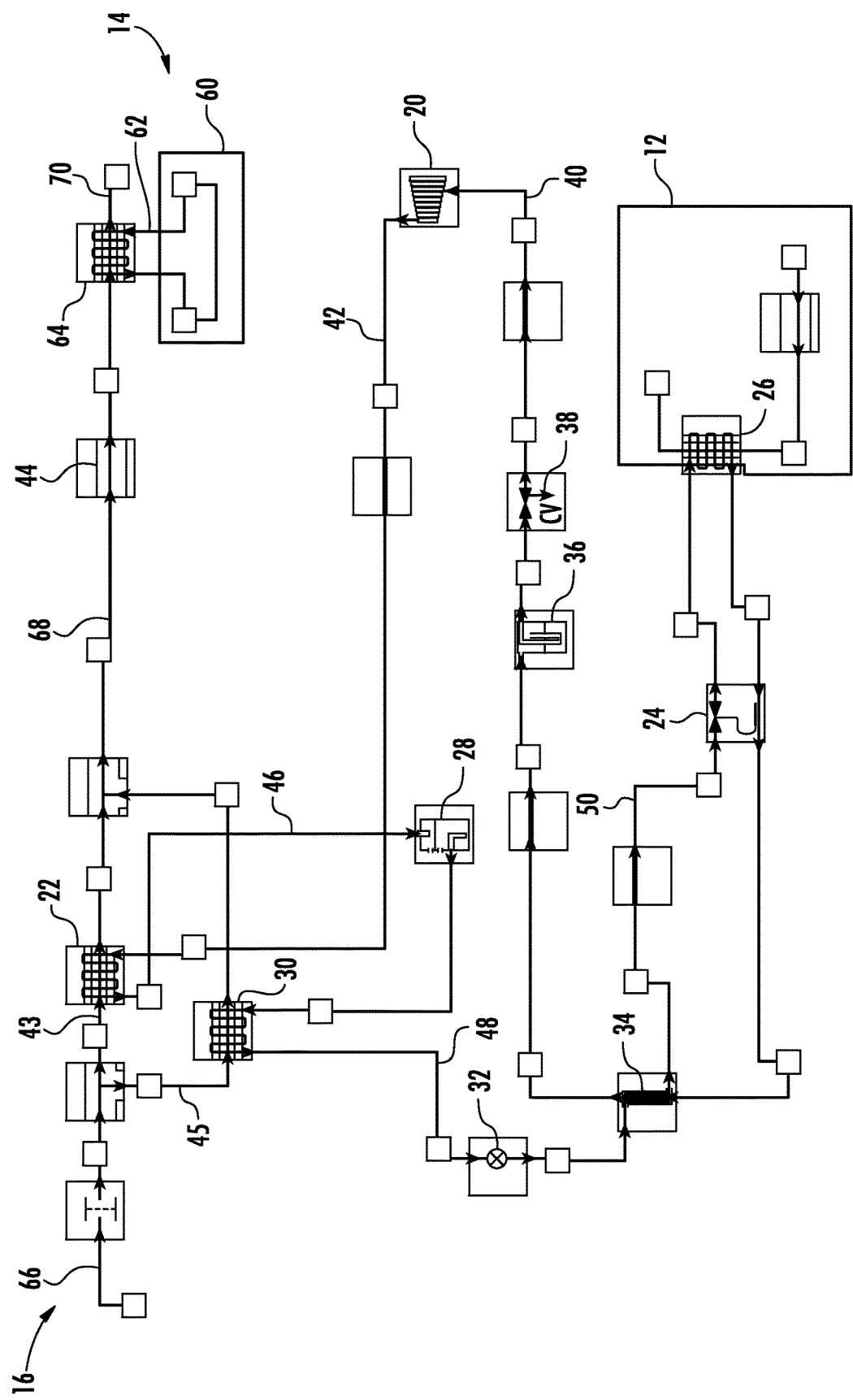

STAGED EXPANSION SYSTEM AND METHOD

FIELD OF THE INVENTION

The subject matter disclosed herein relates to refrigeration systems and, more specifically, to transportation refrigeration systems.

BACKGROUND

Temperature controlled cargo containers, such as refrigerated trailers, are commonly used to transport food products and other temperature sensitive products. A refrigerated trailer typically includes a refrigeration unit generally mounted on the front wall of the trailer with a portion protruding into the interior of the trailer. In some known trailers, a fuel-burning engine may be used to drive a compressor of the refrigeration system.

Due to refrigerant regulations for some refrigeration systems, replacement refrigerants may cause an increase in the discharge temperature of the refrigeration loop. This temperature increase may create performance issues during certain conditions such as, for example, high ambient conditions, which may require additional cooling of one or more system compressors.

BRIEF DESCRIPTION OF THE INVENTION

In one aspect, a refrigeration system is provided. The refrigeration system includes a compressor configured to compress a refrigerant, a condenser, and an evaporator. A heat exchanger is disposed downstream of the condenser and upstream of the evaporator, and disposed downstream of the evaporator and upstream of the compressor, the heat exchanger configured to facilitate heat exchange between the refrigerant supplied from the condenser and the refrigerant supplied from the evaporator. A first expansion device is disposed downstream of the heat exchanger and upstream of the evaporator, and a second expansion device is disposed downstream of the condenser and upstream of the heat exchanger. The second expansion device is configured to cool the refrigerant passing therethrough to cool the refrigerant in the heat exchanger supplied from the evaporator to the compressor.

In addition to one or more of the features described above, or as an alternative, further embodiments may include: wherein the heat exchanger is a liquid suction heat exchanger; wherein the heat exchanger is a brazed plate heat exchanger; wherein the refrigeration system is a transportation refrigeration system configured to thermally condition a cargo container; a receiver disposed downstream of the condenser and upstream of the second expansion device; a subcooler disposed downstream of the receiver and upstream of the second expansion device; an accumulator disposed downstream of the heat exchanger and the evaporator, and upstream of the compressor; a suction modulating valve disposed downstream of the heat exchanger and the evaporator, and upstream of the compressor; and/or a power generation system including an engine fluidly coupled to a radiator, and a cooling loop configured to supply cooling air to the condenser and the radiator to absorb heat therefrom.

In another aspect, a transportation refrigeration system configured to provide thermal conditioning for a container is provided. The system includes a compressor configured to compress a refrigerant, a condenser, and an evaporator. A heat exchanger is disposed downstream of the condenser and upstream of the evaporator, and disposed downstream of the evaporator and upstream of the compressor, the heat exchanger configured to facilitate heat exchange between the refrigerant supplied from the condenser and the refrigerant supplied from the evaporator. A first expansion device is disposed downstream of the heat exchanger and upstream of the evaporator, and a second expansion device is disposed downstream of the condenser and upstream of the heat exchanger. The second expansion device is configured to cool the refrigerant passing therethrough to cool the refrigerant in the heat exchanger supplied from the evaporator to the compressor.

In addition to one or more of the features described above, or as an alternative, further embodiments may include: wherein the heat exchanger is a liquid suction heat exchanger; wherein the heat exchanger is a brazed plate heat exchanger; a receiver disposed downstream of the condenser and upstream of the second expansion device; a subcooler disposed downstream of the receiver and upstream of the second expansion device; an accumulator disposed downstream of the heat exchanger and the evaporator, and upstream of the compressor; a suction modulating valve disposed downstream of the accumulator and upstream of the compressor; and/or a power generation system including an engine fluidly coupled to a radiator, and a cooling loop configured to supply cooling air to the condenser and the radiator to absorb heat therefrom.

In yet another aspect, a method of assembling a refrigeration system is provided. The method includes providing a compressor configured to compress a refrigerant, providing a condenser, and providing an evaporator. The method further includes providing a heat exchanger disposed downstream of the condenser and upstream of the evaporator, and disposed downstream of the evaporator and upstream of the compressor, the heat exchanger configured to facilitate heat exchange between the refrigerant supplied from the condenser and the refrigerant supplied from the evaporator, providing a first expansion device disposed downstream of the heat exchanger and upstream of the evaporator, and providing a second expansion device disposed downstream of the condenser and upstream of the heat exchanger, the second expansion device configured to cool the refrigerant passing therethrough to cool the refrigerant in the heat exchanger supplied form the evaporator to the compressor.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a schematic view of an exemplary refrigeration system.

DETAILED DESCRIPTION OF THE INVENTION

FIG. 1 illustrates a refrigeration system 10. In the exemplary embodiment, refrigeration system 10 is operably associated with a temperature controlled cargo container 12 configured to maintain a cargo located inside cargo container 12 at a selected temperature through the use of refrigeration system 10. The cargo container may be utilized to transport cargo via, for example, a truck, a train or a ship. Transportation refrigeration applications are distinct from other applications due to their wide range of operating conditions. For example, the ambient temperature may vary from 148° F. to −20° F. (64.4° C. and −28.9° C.), and the cargo container may be set at a temperature between 100° F. and −20° F. (38.8° C. and −28.9° C.). However, system 10 may be utilized in various other refrigeration applications.

In the exemplary embodiment, refrigeration system 10 may be powered by a power generation system 14, and a cooling loop 16 provides thermal heat exchange between refrigeration system 10 and power generation system 14. Although described as a refrigeration system, system 10 may be any suitable environment conditioning system. For example, system 10 may be a cab air conditioning unit for a vehicle. In other embodiments, system 10 may be a direct drive application, a container unit application, or other configuration.

Refrigeration system 10 generally includes a compressor 20, a condenser 22, a main expansion device 24, and an evaporator 26. As illustrated in the exemplary embodiment, system 10 includes a receiver 28, a subcooler 30, an expansion device 32, a liquid suction heat exchanger 34, an accumulator 36, and a compressor pressure limiter (CPL) or suction modulating valve (SMV) 38. In other embodiments, system 10 may not include receiver 28, subcooler 30, and/or accumulator 36.

Refrigeration system 10 is a closed loop system through which refrigerant is circulated in various states such as liquid and vapor. As such, a low temperature, low pressure superheated gas refrigerant is drawn into compressor 20 through a conduit 40 from evaporator 26. The refrigerant is compressed and the resulting high temperature, high pressure superheated gas is discharged from compressor 20 to condenser 22 through a conduit 42

In condenser 22, gaseous refrigerant is condensed into liquid as it gives up heat. The superheated gas refrigerant enters condenser 22 and is de-superheated, condensed, and sub-cooled through a heat exchanger process with air forced across condenser 22 by a condenser fan 44 (via a conduit 43) to absorb heat. Alternatively, water or other fluid may be used to absorb heat from condenser. The liquid refrigerant is discharged from condenser 22 and supplied through a conduit 46 via receiver 28 to subcooler 30. The refrigerant is further sub-cooled by air forced by condenser fan 44 (through a conduit 45) and is supplied through a conduit 48 to expansion device 32. In some embodiments, subcooler 30 may be integrated into condenser 22.

In the exemplary embodiment, expansion device 32 is a modulation valve or an electronic expansion valve. Expansion device 32 is disposed upstream of liquid suction heat exchanger 34 in order to decrease the inlet temperature of heat exchanger 34. Refrigerant passing from evaporator 26 to compressor 20 via heat exchanger 34 is cooled by the refrigerant expanded in expansion device 32, which lowers the suction temperature and thus the discharge temperature of compressor 20. As such, the discharge temperature of compressor 20 can be controlled and lowered with a minor impact on the cooling capacity performance of refrigeration system 10. Accordingly, system 10 may not include a liquid injection valve that may have a larger impact on system performance. Expansion device 32 may be selectively opened or closed to facilitate control of the compressor suction/discharge temperature. For example, if it is not desirable to lower the discharge temperature (e.g., during lower ambient temperatures), expansion device 32 may be in a fully open position. In contrast, if it is desirable to lower the compressor discharge temperature (e.g., during higher ambient temperatures), expansion device 32 may be placed in a partially open position. Refrigerant passing through expansion device 32 is subsequently supplied to heat exchanger 34.

In the exemplary embodiment, liquid suction heat exchanger 34 reduces heating of vaporized and/or vaporizing refrigerant from evaporator 26 against the liquid refrigerant expanded in expansion device 32. In other embodiments, heat exchanger 34 may be a brazed plate heat exchanger. The warmed refrigerant is subsequently supplied from heat exchanger 34 to evaporator 26 through a conduit 50, by passing the refrigerant through metering or expansion device 24 (e.g., expansion valve), which converts the relatively higher temperature, high pressure sub-cooled liquid to a low temperature saturated liquid-vapor mixture.

The low temperature saturated liquid-vapor refrigerant mixture then enters evaporator 26 where it boils and changes states to a superheated gas as it absorbs the required heat of vaporization from air in the container (or other heat exchange fluid). The low pressure superheated gas then passes in heat exchange relation with heat exchanger 34, where heating is further reduced to decrease the suction temperature of compressor 20. The superheated gas is then drawn through accumulator 36 and SMV 38 into the inlet of compressor 20 and the cycle is repeated.

In the illustrated embodiment, power generation system 14 generally includes an engine 60 coupled to a fuel tank (not shown). A conduit 62 supplies coolant between engine 60 and a heat exchanger 64 (e.g., a radiator) to cool engine 60 during operation. In alternate embodiments, system 10 may not include power generation system 14 (e.g., with a direct drive unit or a container unit without an engine).

In the illustrated embodiment, cooling loop 16 generally includes an air intake conduit 66 that supplies ambient or other cooling fluid to conduits 43, 45 via fan 44. Conduits 43, 45 may combine into a single conduit 68, and fan 44 subsequently forces air across heat exchanger 64 to absorb heat. The air heated by heat exchangers 22, 30, and 64 is subsequently vented to the atmosphere via a conduit 70.

Described herein are systems and methods for controlling suction/discharge temperature of a compressor in a refrigeration system. This may be required for system utilizing refrigerants such as R407F and R448A, which may result in higher compressor discharge temperatures in certain conditions. A first expansion device such as a modulation valve or an electronic expansion valve is disposed downstream of the condenser and upstream of a heat exchanger such as a liquid suction heat exchanger or a braze plate heat exchanger. After passing through the heat exchanger, the expanded refrigerant is subsequently passed through a second expansion device disposed downstream of the heat exchanger and upstream of an evaporator. The first expansion device decreases the refrigerant temperature of the heat exchanger, thereby reducing the compressor discharge temperature with little or no impact on the cooling capacity performance of the refrigeration system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A refrigeration system comprising:
   a compressor configured to compress a refrigerant;
   a condenser;
   an evaporator;
   a heat exchanger disposed downstream of the condenser and upstream of the evaporator, and disposed downstream of the evaporator and upstream of the compressor, the heat exchanger configured to facilitate heat exchange between the refrigerant supplied from the condenser and the refrigerant supplied from the evaporator;
   a first expansion device disposed downstream of the heat exchanger and upstream of the evaporator; and
   a second expansion device disposed downstream of the condenser and upstream of the heat exchanger, the second expansion device configured to cool the refrigerant passing therethrough to cool the refrigerant in the heat exchanger supplied from the evaporator to the compressor, an outlet of the second expansion device directly connected to an inlet of the heat exchanger, wherein all of the refrigerant passing through the second expansion device is subsequently supplied to the heat exchanger.

2. The refrigeration system of claim 1, wherein the heat exchanger is a liquid suction heat exchanger.

3. The refrigeration system of claim 1, wherein the heat exchanger is a brazed plate heat exchanger.

4. The refrigeration system of claim 1, wherein the refrigeration system is a transportation refrigeration system configured to thermally condition a cargo container.

5. The refrigeration system of claim 1, further comprising a receiver disposed downstream of the condenser and upstream of the second expansion device.

6. The refrigeration system of claim 5, further comprising a subcooler disposed downstream of the receiver and upstream of the second expansion device.

7. The refrigeration system of claim 1, further comprising an accumulator disposed downstream of the heat exchanger and the evaporator, and upstream of the compressor.

8. A refrigeration system comprising:
   a compressor configured to compress a refrigerant;
   a condenser;
   an evaporator;
   a heat exchanger disposed downstream of the condenser and upstream of the evaporator, and disposed downstream of the evaporator and upstream of the compressor, the heat exchanger configured to facilitate heat exchange between the refrigerant supplied from the condenser and the refrigerant supplied from the evaporator;
   a first expansion device disposed downstream of the heat exchanger and upstream of the evaporator; and
   a second expansion device disposed downstream of the condenser and upstream of the heat exchanger, the second expansion device configured to cool the refrigerant passing therethrough to cool the refrigerant in the heat exchanger supplied from the evaporator to the compressor, an outlet of the second expansion device directly connected to an inlet of the heat exchanger;
   further comprising a suction modulating valve disposed downstream of the heat exchanger and the evaporator, and upstream of the compressor.

9. A refrigeration system comprising:
   a compressor configured to compress a refrigerant;
   a condenser;
   an evaporator;
   a heat exchanger disposed downstream of the condenser and upstream of the evaporator, and disposed downstream of the evaporator and upstream of the compressor, the heat exchanger configured to facilitate heat exchange between the refrigerant supplied from the condenser and the refrigerant supplied from the evaporator;
   a first expansion device disposed downstream of the heat exchanger and upstream of the evaporator; and
   a second expansion device disposed downstream of the condenser and upstream of the heat exchanger, the second expansion device configured to cool the refrigerant passing therethrough to cool the refrigerant in the heat exchanger supplied from the evaporator to the compressor, an outlet of the second expansion device directly connected to an inlet of the heat exchanger;
   a power generation system including an engine fluidly coupled to a radiator; and
   a cooling loop configured to supply cooling air to the condenser and the radiator to absorb heat therefrom.

10. A transportation refrigeration system configured to provide thermal conditioning for a container, the system comprising:
    a compressor configured to compress a refrigerant;
    a condenser;
    an evaporator;
    a heat exchanger disposed downstream of the condenser and upstream of the evaporator, and disposed downstream of the evaporator and upstream of the compressor, the heat exchanger configured to facilitate heat exchange between the refrigerant supplied from the condenser and the refrigerant supplied from the evaporator;
    a first expansion device disposed downstream of the heat exchanger and upstream of the evaporator; and
    a second expansion device disposed downstream of the condenser and upstream of the heat exchanger, the second expansion device configured to cool the refrigerant passing therethrough to cool the refrigerant in the heat exchanger supplied from the evaporator to the compressor, an outlet of the second expansion device directly connected to an inlet of the heat exchanger, wherein all of the refrigerant passing through the second expansion device is subsequently supplied to the heat exchanger.

11. The transportation refrigeration system of claim 10, wherein the heat exchanger is a liquid suction heat exchanger.

12. The transportation refrigeration system of claim 10, wherein the heat exchanger is a brazed plate heat exchanger.

13. The transportation refrigeration system of claim 10, further comprising a receiver disposed downstream of the condenser and upstream of the second expansion device.

14. The transportation refrigeration system of claim 13, further comprising a subcooler disposed downstream of the receiver and upstream of the second expansion device.

15. The transportation refrigeration system of claim 14, further comprising an accumulator disposed downstream of the heat exchanger and the evaporator, and upstream of the compressor.

16. A transportation refrigeration system configured to provide thermal conditioning for a container, the system comprising:
    a compressor configured to compress a refrigerant;
    a condenser;

an evaporator;
a heat exchanger disposed downstream of the condenser and upstream of the evaporator, and disposed downstream of the evaporator and upstream of the compressor, the heat exchanger configured to facilitate heat exchange between the refrigerant supplied from the condenser and the refrigerant supplied from the evaporator;
a first expansion device disposed downstream of the heat exchanger and upstream of the evaporator; and
a second expansion device disposed downstream of the condenser and upstream of the heat exchanger, the second expansion device configured to cool the refrigerant passing therethrough to cool the refrigerant in the heat exchanger supplied from the evaporator to the compressor, an outlet of the second expansion device directly connected to an inlet of the heat exchanger;
a suction modulating valve disposed downstream of the evaporator and upstream of the compressor.

17. A transportation refrigeration system configured to provide thermal conditioning for a container, the system comprising:
a compressor configured to compress a refrigerant;
a condenser;
an evaporator;
a heat exchanger disposed downstream of the condenser and upstream of the evaporator, and disposed downstream of the evaporator and upstream of the compressor, the heat exchanger configured to facilitate heat exchange between the refrigerant supplied from the condenser and the refrigerant supplied from the evaporator;
a first expansion device disposed downstream of the heat exchanger and upstream of the evaporator; and
a second expansion device disposed downstream of the condenser and upstream of the heat exchanger, the second expansion device configured to cool the refrigerant passing therethrough to cool the refrigerant in the heat exchanger supplied from the evaporator to the compressor, an outlet of the second expansion device directly connected to an inlet of the heat exchanger;
a power generation system including an engine fluidly coupled to a radiator; and
a cooling loop configured to supply cooling air to the condenser and the radiator to absorb heat therefrom.

18. A method of assembling a refrigeration system, the method comprising:
providing a compressor configured to compress a refrigerant;
providing a condenser;
providing an evaporator;
providing a heat exchanger disposed downstream of the condenser and upstream of the evaporator, and disposed downstream of the evaporator and upstream of the compressor, the heat exchanger configured to facilitate heat exchange between the refrigerant supplied from the condenser and the refrigerant supplied from the evaporator;
providing a first expansion device disposed downstream of the heat exchanger and upstream of the evaporator; and
providing a second expansion device disposed downstream of the condenser and upstream of the heat exchanger, the second expansion device configured to cool the refrigerant passing therethrough to cool the refrigerant in the heat exchanger supplied form the evaporator to the compressor, an outlet of the second expansion device directly connected to an inlet of the heat exchanger;
wherein all of the refrigerant passing through the second expansion device is subsequently supplied to the heat exchanger.

* * * * *